United States Patent [19]

Greune et al.

[11] Patent Number: 4,522,025
[45] Date of Patent: Jun. 11, 1985

[54] APPARATUS FOR CONTROLLING LOAD DISTRIBUTION AND SPEED OF GAS SPEED OF GAS TURBINE SYSTEMS AND PARTICULARLY OF GAS TURBINE ENGINES

[75] Inventors: Christian Greune, Furstenfeldbruck; Heinrich Kümmeke, Dachau-Etzenhausen, both of Fed. Rep. of Germany

[73] Assignee: MTU, Munich, Fed. Rep. of Germany

[21] Appl. No.: 582,015

[22] Filed: Feb. 21, 1984
(Under 37 CFR 1.47)

[30] Foreign Application Priority Data

Feb. 26, 1983 [DE] Fed. Rep. of Germany ....... 3306889

[51] Int. Cl.$^3$ .................................................. F02C 9/28
[52] U.S. Cl. ................................. 60/39.15; 60/39.282
[58] Field of Search .............. 60/39.03, 39.15, 39.161, 60/39.282

[56] References Cited

U.S. PATENT DOCUMENTS

| | | | |
|---|---|---|---|
| 3,174,284 | 3/1965 | McCarthy | 60/39.15 |
| 3,174,581 | 3/1965 | McCarthy | 60/39.15 |
| 3,200,886 | 8/1965 | Magri et al. | 60/39.15 |
| 3,234,740 | 2/1966 | Moore | 60/39.15 |
| 3,365,882 | 1/1968 | Greune | 60/39.15 |
| 3,600,888 | 8/1971 | Nethken et al. | 60/39.15 |
| 3,620,010 | 11/1971 | Davis | 60/39.15 |
| 3,963,372 | 6/1976 | McLain et al. | 60/39.15 |

*Primary Examiner*—Louis J. Casaregola
*Attorney, Agent, or Firm*—Posnack, Roberts, Cohen & Spiecens

[57] ABSTRACT

A device for controlling the load distribution and speed of gas turbine systems and particularly gas turbine engines comprising for each engine a fuel control unit having a proportionally acting speed governor and a master speed governor for a common output shaft of the gas turbine systems and a load distributing control device. The master speed governor forms signals from the speed deviation and the load distributing control device forms signals from load deviations of the gas turbine systems from one another. The signals influence the speed set points of the proportionally acting governors through electronic operational amplifiers forming signal outputs from the deviation signals and preferably an auxiliary quantity and electronic summing amplifiers for adding the signal outputs together to form the control signals.

15 Claims, 3 Drawing Figures

APPARATUS FOR CONTROLLING LOAD DISTRIBUTION AND SPEED OF GAS SPEED OF GAS TURBINE SYSTEMS AND PARTICULARLY OF GAS TURBINE ENGINES

FIELD OF THE INVENTION

This invention relates to a device for controlling the load distribution and the speed of gas turbine systems, particularly gas turbine engines. More particularly, the invention relates to control devices for gas turbine engines each of which has an output shaft forming part of a common output shaft of the system, a respective fuel control unit including a proportionally acting speed governor, a master speed governor for the output shaft and a load distributing control unit.

The master speed governor forms signals indicative of speed deviation of the engines and the load distributing control unit forms signals based on load deviation of the gas turbine engines.

The control device comprises means for adjusting the speed set points of the proportionally acting speed governors in response to the aforementioned signals.

PRIOR ART

A control device of this type is disclosed in DE-PS 12 72 046 for use with two gas turbine engines operating in parallel. The system includes a torque signal pickup for load deviations of each engine and an actuating mechanism associated with the torque signal pickups and with a master speed governor, said actuating mechanism acting on a speed selector device of each fuel control unit by means of a speed speed lever and a respective transfer linkage, the acutating mechanism including a piston which moves in a stationary cylinder against the action of a spring and in response to an air pressure signal from the master speed governor to vary the position of the speed adjusting levers and transfer linkages via an actuating gear linkage in the same sense, and another piston which moves in a floating cylinder in response to air pressure signals from the torque signal pickups applied at either end to vary the position of said levers and transfer linkages in the opposite sense via said linkages. This enables the overall engine plant to be controlled without special intervention in the fuel control units and, thus, without infringement on the separate control option for the individual engines. This makes it possible to couple the engines to the fuel control units using for each, a respective proportionally acting speed governor, with no changes required in the fuel control units and where the engines will remain operative and controllable at small total load or with one engine failed. Also, the transient and permanent speed variation or deviation of the proportionally acting speed governors in the train of load changes is notably reduced. Additionally, approximately equal load distribution between engines is ensured. The action of the master speed governor and the second piston are integrated and only very small permanent control errors are produced for the control of load distribution and for the control of the speed of the common output shaft, and the two control loops are disconnected one from the other. The integrally acting master speed governor and the proportionally acting speed governors are connected in series.

SUMMARY OF THE INVENTION

An object of the present invention is to provide improvements in the control device described above such that its weight and its complexity are reduced and the accuracy of its control action is improved while the basic concept of the known control device, as well as its cited effects and advantages, are preserved.

It is a particular object of the present invention to provide improvements in the control device comprising operational amplifier means for forming output signals from at least the speed deviation signals and the load deviation signals and summing amplifier means connected to said operational amplifier means for adding the output signals from the operational amplifier means to form signals for adjusting the speed set points of the proportionally acting speed governors. In this arrangement the mechanical master speed governor, the actuating means and the very long, multiply deflected and therefore frictionally loaded transfer linkages are eliminated and are replaced by an electrical speed sensor for the common output shaft, by converters for converting the output signals of the mechanical load signal transmitters into electrical signals, and by said amplifier means. The control device is thus reduced in weight. It also is less complex in more places. Also, the accuracy of control is improved by the use of said amplifier means. Additionally, when more than two gas turbine systems are used, the load distributing control unit can be implemented more readily than with said known control device.

The signal inputs formed by the electronic operational amplifiers from the speed deviation from the speed set point ($\Delta n = N_{spec} - n_{actual}$ or dn), from the load (e.g. torque) deviation from the torque set point ($\Delta M = M_1 - M_2$), from adjustable constants ($k_1 \beta_5$) and conceivably from an auxiliary quantity ($\beta$) further improving the accuracy of control, are addends given in the two equations below for two gas turbine systems for the two signals $\rho_{spec}$ and $\rho'_{spec}$ affecting the set points or speed selector lever angles:

$$\rho_{spec} = \int k_1 \Delta n \, dt + \int k_2 \Delta M \, dt + k_3 \beta + K_4 \Delta n + k_5 dn/dt$$

$$\rho'_{spec} = \int k_1 \Delta n dt - \int k_2 \Delta M \, dt + k_3 \beta + k_4 \Delta n + k_5 dn/dt$$

In these equations, the respective first addend or signal input $a_1$ is the integrally acting (I) input of the master speed governor, the second addend or signal input $a_2$ is the input of the load distributing control unit, the third addend or signal input $a_3$ is the input of the auxiliary quantity ($\beta$), and the fourth and the fifth addends or signal inputs ($a_4$, $a_5$) are the signal input of the proportional or differential (D) input of the master speed governor. The differential input responds to the rate of change of the actual value $n_{act}$ of the speed n of the common output shaft; if the speed changes rapidly, the differential input acts to a greater degree, and it does not act at all if the speed change is slow. In the differential quotient dn/dt, dt is the differential of time, and dn/dt is the derivative of the function n with respect to time t.

The control device of the present invention is preferably used on engines powering the main rotor of a helicopter.

In accordance with a feature of the invention a load-responsive quantity is particularly suitable because the fuel control units will receive a signal ($\beta$) for the impending load change concurrently with the change, not with the delay caused by the speed governors. The load responsive quantity may also be the total output of the gas turbine systems jointly, or the sum of the torques of the output shafts of the gas turbine systems. The auxiliary quantity or quantities $\beta$ may also be the ambient pressure or/and the ambient temperature. When two gas turbine systems are used, the preferred arrangement is that in which a plurality of operational amplifiers are connected in parallel and respectively connected to two summing amplifiers also connected in parallel. The input to the actuators is not obtained by the transfer linkages of the known art but rather by electrical lines transmitting output signals from the summing amplifiers to the acutators. These acutators preferably act on the proportional governors to control the speed selector devices. The actuators can be remotely controlled by the pilot using a program selector. If electrical or electronic load sensors and/or electrical or electronic fuel control systems are used in which the fuel supply is regulated in accordance with speed and/or compressor pressure the inventive concept is further improved, and additionally the signal converters are omitted by use of the electrical or electronic load sensors. The electrical or electronic fuel control systems correspond in functional aspects to the equivalent mechanical devices. If the amplifiers form part of an electronic computer the complexity of the control device will be moderate. The electronic computer is a superordinate open or closed-loop control device.

The mechanical load signal transmitters, for example, transmit the speeds of the gas generators or the pressures of the turbo compressors of the gas turbine systems, but preferably the torques of the output shafts of the gas turbine systems; these quantities are converted into electrical signals, with respective signal converters provided on the engine or in the electronic computer.

If each of the gas turbine systems is of a two or three-shaft construction and if one shaft is that of a power turbine and the other shaft or shafts that of a gas generator, the proportionally acting speed governor controls the speed of the power turbine.

The common output shaft is then formed by the shafts of the two or three power turbines.

For reasons of operational reliability, each gas turbine system has its own fuel control unit. The gas turbine systems normally have the same rated output.

DETAILED DESCRIPTION

Figure 1:
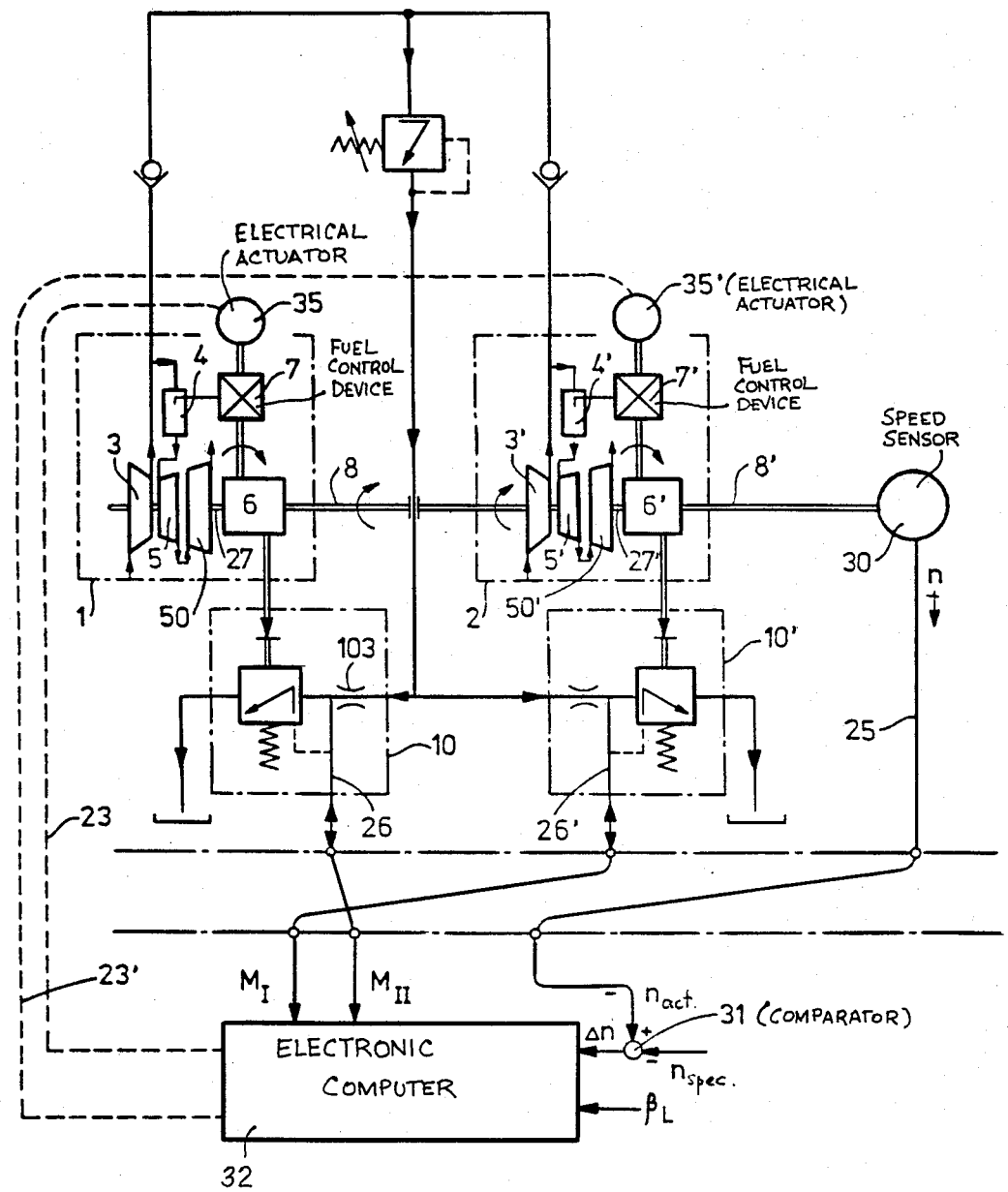
FIG. 1 schematically illustrates an embodiment of a control device according to the present invention for two gas turbine engines.

With reference now to FIG. 1 therein is shown a control device for two equal, double-spool gas turbine engines 1 and 2 of the same output rating in parallel flow arrangement. Each gas turbine engine has a respective gas generator comprising a turbo compressor 3,3' and a gas turbine 5,5' on a common shaft, a combustion chamber 4,4' and a power turbine (free turbine) 50,50' on a separate shaft 27,27'. The drive from the shafts 27,27' is transmitted to two identical reduction gears 6,6' which drive two output shafts 8,8' through a centrifugal coupling 65 (see FIG. 2 which shows shaft 8 driven through coupling 65). The shafts 8,8' serve as a common output shaft and they jointly drive the main rotor 29 of a helicopter through a common bevel gear arrangement 28. Between the gears 6,6' and the respective centrifugal coupling 65 is a free-wheel clutch 64. The engines 1 and 2 are mechanically coupled through the bevel gear arrangement 28 and output shafts 8,8', and the connection of the shafts 8 and 8' with the engines 1 and 2 can be selectively completed or broken according to a predetermined arrangement by means of the free-wheel clutches 64 and/or the centrifugal couplings 65.

As it will also become apparent from FIG. 1, an electrical speed sensor, such as tachogenerator 30 is driven or operated by one of the output shafts 8,8' to measure the speed n of the common output shaft.

As will also be seen from FIG. 1, the control device for each engine 1 and 2 has a respective fuel control device 7 and 7'.

The fuel control device 7 or 7' is either an electrical or electronic device which receives, for example, from associated gear 6,6', a speed signal from the output shaft 27 or 27' and the outlet pressure of the turbo compressor 3 or 3' to vary the position, through an electrohydraulic converter (not shown) of a device such as a valve for controlling fuel flow or the fuel control device may be a mechanical device driven by gear 6 or 6'.

Figure 2:
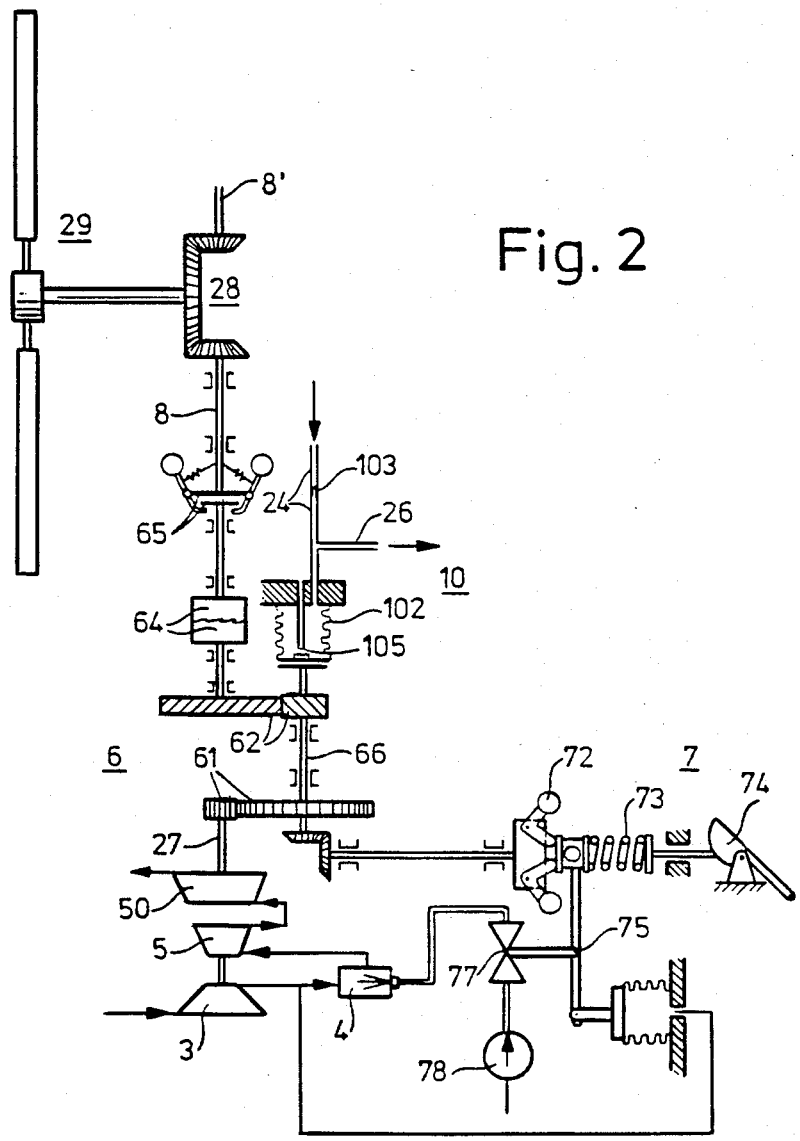
FIG. 2 diagrammatically illustrates the mechanical components of the control device in greater detail.

As shown in FIGS. 1 and 2, the gears 6 and 6' have two signal taps to determine the load distribution between engines 1 and 2 by means of two mechanical torque signal pickups 10 and 10'. The gear 6 or 6' comprises a set of straight-toothed gears 61 and a set of helical gears 62. The circumferential force of the gear 62 produces an axial force acting on a bellows 102. Compressed air taken from the outlets of the turbo compressors 3 and 3' as auxiliary energy enters a line 24 and passes through a forward restrictor 103 to the bellows 102 to shift a shaft 66 of the gear 6 or 6' axially through a small distance. This opens a rear restrictor 105, which allows compressed air to escape until the force of the bellows 102 is equal to the axial force of the shaft 66. This makes the air pressure $M_I$ or $M_{II}$ in a line 26 or 26' connected at a point between the bellows 102 and the forward restrictor 103 proportional to the torque being transmitted in the gear 6 or 6'.

Figure 3:
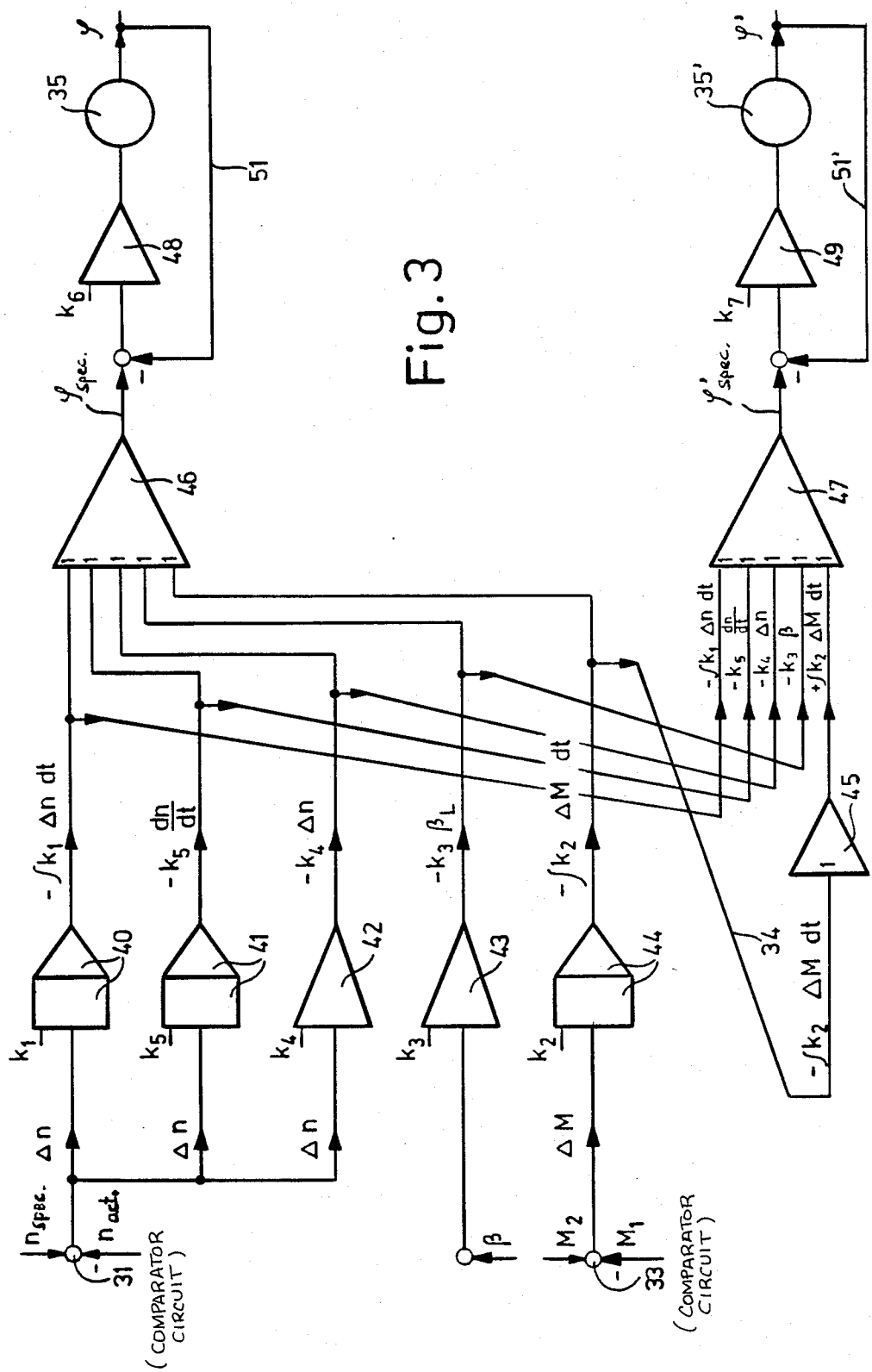
FIG. 3 schematically illustrates an analog circuit of the control device in greater detail.

The lines 26 and 26' are connected to an electronic computer 32 (or a mechanical-electronic computer) which includes electrical signal converters (not shown) for converting the air pressures $M_I$ and $M_{II}$ from the lines 26 and 26' into electrical signals $M_1$ and $M_2$, as well as variously interconnected electronic amplifiers 40 to 47 (FIG. 3). Electronic summing amplifiers 46 and 47 (FIG. 3) are connected by electrical lines 23 and 23' to electrical actuators 35 and 35' (FIGS. 1 and 3) via electronic selection amplifiers 48 and 49 (FIG. 3).

Electrical or electronic load signal transmitters can be provided in lieu of the mechanical torque signal pickups 10 and 10', which would then eliminate the need for the signal con- verters.

In accordance with FIGS. 1 and 2 a proportionally acting speed governor of the mechanical fuel control unit 7 (7') is driven by the shaft 27 (27') through the gear 6 (6'), more precisely through the pair of gears 61 thereof, proportionally to the speed of the power turbine 50 (50'). Flyweights 72 act against the force of a spring 73, which is preloaded by a speed selector device 74. The difference between the spring force and the centrifugal force causes a linkage 75 to move and vary the cross-sectional area of a valve 77. Fuel delivered by a pump 78 is metered via valve 77 and directed to the combustion chamber 4 (4').

As it will also become apparent from FIG. 1, the speed sensor 30 feeds the speed signal $n_{act}$, through an electrical line 25, to a comparator circuit 31, to which is also supplied the speed signal $n_{spec}$, which in helicopter applications is set by the pilot. The circuit 31 produces a speed deviation signal $\Delta n$, cf.-FIG. 3.

The electronic computer 32 comprises the analog device shown in FIG. 3 which includes the comparator circuit 31 and a comparator circuit 33, at which torque deviation $\Delta M$ is formed from the electrical signals $M_1$ and $M_2$. The computer also encompasses the electronic amplifiers 40 to 47. Each of the amplifiers 40,41, 42, 43, 44, 48 and 49 has a variable amplification represented by a respective constant $k_1$, $k_5$, $k_4$, $k_3$, $k_2$, $k_6$ and $k_7$. The operational amplifier 40 is interconnected to act as an integrating circuit to form the signal output $a_1 = \int k_1 \Delta n dt$ from the speed deviation n and the constant $k_1$. The operational amplifier 41 is interconnected to act as a differentiating circuit to form the signal output $a_5 = k_5 dn/dt$ from $\Delta n$ and $k_5$. The operational amplifier 42 is interconnected to act as a proportional amplifier to form the signal output $a_4 = k_4 \Delta n$ from $\Delta n$ and $k_4$. The operational amplifier 43 is interconnected as a proportional amplifier to form the signal output $a_3 = k_3 \int_L$ from a load-sensitive electrical signal $\beta_L$ and the constant $k_3$. The operational amplifier 44 is interconnected to act as an intergrating circuit to form the signal output $a_2 = \int k_2 \Delta M\, dt$ from the deviation $\Delta M$ and the constant $k_2$. The operational amplifiers 40 to 44 are connected to two summing amplifiers 46 and 47 connected in parallel, which add the signal outputs $A_1$ to $a_5$ and form the signals $\rho$ spec and $\rho'$ spec. A proportional amplifier 45 having an amplification factor of 1 is connected in the parallel line 34 between the operational amplifier 44 and the summing amplifier 48 to reverse the sign of the signal output $a_2$. The signals $\rho_{spec}$ and $\rho'_{spec}$ are respectively fed to selector amplifiers 48 and 49, which are interconnected to act as proportional amplifiers to drive the electrical actuators 35 and 35'. The selector amplifiers 48 and 49 and the actuator 35 or 35' form part of an actuating device transforming the signal $\rho_{spec}$ or $\rho'_{spec}$ into an adjusting displacement value. $\rho$ or $\rho$ (or $\rho_{act}$ or $\rho'_{act}$) proportional to the signal, thus providing the force needed to adjust the position of the respective speed selector device 74. A respective servo circuit is indicated by the numeral 51 or 51'.

The analog computer circuitry or similar device can be replaced by corresponding digital computer circuitry or similar device as will be evident to those skilled in the art.

It is apparent that modifications other than those described herein may be made to the embodiments without departing from the inventive concept.

More particularly, the pneumatic, hydraulic or mechanical elements employed in the embodiments can be replaced by electrical or electronic elements to greatly economize weight. This applies equally to the feedback transmitters of the control device.

The invention may also find use on systems having more than two gas turbines and even on helicopters having more than one rotor.

What is claimed is:

1. In apparatus for controlling the load distribution and speed of gas turbine systems, and particularly of gas turbine engines each having an output shaft forming part of a common output shaft of the engines, a respective fuel control unit including a proportionally acting speed governor having adjustable speed set points, a master speed governor for the output shaft and a load distributing control unit, the master speed governors forming signals indicative of speed deviation of the engines, the load distributing control unit forming signals based on load deviation of the gas turbine engines and means for adjusting the speed set points of the proportionally acting speed governors in response to said signals, the improvement wherein the adjusting means comprises operational amplifier means for forming output signals from at least the speed deviation signals and the load deviating signals and summing amplifier means connected to said operational amplifier means for adding the output signals from the operational amplifier means to form signals $\rho_{spec}\,\rho'_{spec}$ for adjusting the speed set points of the proportionally acting speed governors.

2. The improvement as claimed in claim 1 comprising electrical speed sensor means for one of said output shafts.

3. The improvement as claimed in claim 1 comprising load sensing means for each turbine engine for producing a signal related to the output delivered by the turbine of each engine.

4. The improvement as claimed in claim 3 wherein said load sensing means comprises a mechanical load sensor and means for converting the output of the mechanical load sensor to an electrical signal.

5. The improvement as claimed in claim 1 wherein said operational amplifier means comprises an operational amplifier producing an output signal from an input based on output delivered by the turbine of each engine and an auxiliary factor serving to improve the accuracy of control.

6. The improvement as claimed in claim 5 wherein said auxiliary factor is based on the output delivered by the turbine of each engine.

7. The improvement as claimed in claim 6 wherein the gas turbine engines drive the main rotor of a helicopter, said output delivered by the turbine of each engine being represented by the variable blade angle of the rotor.

8. The improvement as claimed in claim 1 wherein two gas turbine engines are provided, said operational amplifier means comprising a plurality of operational amplifiers connected in parallel, said summing amplifier means comprising two summing amplifiers connected in parallel to said operational amplifiers, and one proportional amplifier connected between one of the operational amplifiers and one of the summing amplifiers, said proportional amplifier having an amplification factor of $-1$ to reverse the sign of the output from the operational amplifier to the summing amplifier.

9. The improvement as claimed in claim 8 wherein said summing amplifiers produce respective output signals controlling the fuel control units of the respective gas turbine engines.

10. The improvement as claimed in claim 9 further comprising actuator means coupled to associated proportionally acting speed governors of respective fuel control units for controlling the speed set points of said proportionally acting speed governors in response to the output signals from the summing amplifiers.

11. The improvement as claimed in claim 10 further comprising variable amplification selection amplifiers connected between respective summing amplifiers and their associated actuator means for serving as proportional amplifiers to drive said actuator means.

12. The improvement as claimed in claim 1 comprising load sensor means for forming electrical output signals based on output load of the gas turbines of the respective gas turbine engines, said electrical output signals constituting the signals from the load distributing control unit.

13. The improvement as claimed in claim 1 wherein each fuel control unit has a speed input and a compressor pressure input and its output controls fuel supply to a combustion chamber of the gas turbine engine.

14. The improvement as claimed in claim 13 wherein the output of the fuel control unit is an electrical signal, said fuel control unit further comprising means controlling fuel supply to the combustion chamber in response to said electrical signal.

15. The improvement as claimed in claim 1 wherein said operational amplifier means and said summing amplifier means respectively include amplifiers at least some of which constitute part of an electronic computer.

* * * * *